UNITED STATES PATENT OFFICE.

MICHAEL KARDOS, OF CHARLOTTENBURG, AND PAUL NAWIASKY, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

BLUISH-GREEN VAT DYES AND PROCESS OF MAKING THEM.

1,253,252.   Specification of Letters Patent.   Patented Jan. 15, 1918.

No Drawing.   Application filed April 15, 1914.   Serial No. 831,968.

*To all whom it may concern:*

Be it known that we, MICHAEL KARDOS and PAUL NAWIASKY, citizens of the Austrian Empire, residing at Charlottenburg and Ludwigshafen-on-the-Rhine, Germany, have invented new and useful Improvements in Bluish-Green Vat Dyes and Processes of Making Them, of which the following is a specification.

The specification of application Serial No. 776,541 (Patent No. 1,216,134) describes and claims generically a new class of vat coloring matters, which are characterized by being soluble in alkaline hydro-sulfite solution giving red solutions and which dye cotton green shades of excellent fastness. The said application also claims a generic process of producing such dyes by subjecting an aceanthrene-quinone-oxim body to the action of a caustic alkaline melt. The said application further claims the specific coloring matter obtainable by melting anthracene-1.9-dicarboxylic acid imid with caustic alkali, and states that this specific coloring matter yields a cherry-red vat and dyes cotton a beautiful full green. This specific dye apparently possesses an unsubstituted imid group.

In the present application we desire to claim specifically a class of coloring matters which falls generically under the generic claims of the said application Serial No. 776,541, but which are not specifically mentioned or claimed therein.

Our new class of coloring matters are characterized by possessing a substituted imid group by giving from red to violet vats with alkaline hydrosulfite solutions and by yielding bluish-green shades on cotton, that is to say, they yield more bluish shades of green than does the coloring matter obtainable from anthracene-1.9-dicarboxylic acid imid and claimed specifically in the said application Serial No. 776,541.

We can obtain our new coloring matters by subjecting to the action of molten caustic alkali an anthracene-1.9-dicarboxylic acid imid corresponding to the formula

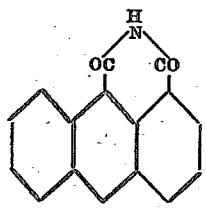

in which the hydrogen of the imid group has been substituted, for instance, by hydroxyl, or alkyl, or aryl. Or we can take a coloring matter obtainable from an anthracene-1.9-dicarboxylic acid imid body in which the hydrogen atom of the imid group has not been substituted, and then treat the coloring matter in such a manner as to effect the introduction of a substituent into the imid group, or groups. This can be effected, for instance, by treating the said non-substituted coloring matters with an alkylating agent, or an aralkylating agent, in aqueous suspension, or in an indifferent solvent, preferably in the presence of an agent capable of fixing free acid.

Instead of employing any of the aforementioned anthracene-1.9-dicarboxylic acid imid bodies we can make use of halogen derivatives thereof, and for the purposes of this invention we regard such halogen derivatives as being equivalent to the nonhalogenized bodies.

The following example will serve to illustrate further the nature of our invention, which, however, is not confined to these examples. The parts are by weight.

*Example 1.*

Introduce 3½ parts of the methyl-amid of anthracene-1.9-dicarboxylic acid corresponding to the formula

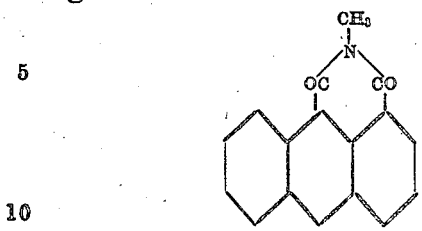

(obtainable by reacting with monomethyl-amin on anthracene-1.9-dicarboxylic acid anhydrid) into 17 parts of molten potassium hydrate, while maintaining a temperature of about 210° C. and continue stirring for some time at this temperature. Then take up the melt with water, pass air through the liquid until the hydro-compound of the coloring matter has been oxidized and complete the precipitation, if necessary, by means of common salt. Filter off the coloring matter, wash it with hot water and alcohol and dry it. If desired, it can be still further purified by extraction with boiling glacial acetic acid. It yields a red-brown solution in concentrated sulfuric acid and from a red-violet vat colors cotton red-violet shades which, in the air, and more especially upon treatment with boiling soap solution, are converted into shades of a beautiful blue-green, which possess an excellent fastness against the action of chlorin.

In a similar manner analogous coloring matters can be obtained from the phenyl-imid of anthracene-1.9-dicarboxylic acid (obtainable from anilin and anthracene-1.9-dicarboxylic acid anhydrid) and from the hydroximid of anthracene (obtainable from hydroxylamin and anthracene-1.9-dicarboxylic acid anhydrid).

*Example 2.*

Place in a reflux apparatus 200 parts of water and 2 parts of the coloring matter obtainable according to Example 2 of the aforesaid application Serial No. 776,541—i. e. by heating 1 part of the anthracene-1.9-dicarboxylic acid imid with 5 parts of caustic alkali and a small quantity of water at from 200° to 230° C. until the formation of the coloring matter is complete, which coloring matter has been obtained in a state of fine division by precipitation from a sulfuric acid solution. Then add 7 parts of potassium carbonate and 10 parts of methyl iodid, and boil the mixture for 10 hours, and afterward filter off and work up. The coloring matter obtained possesses a tinge of green somewhat more bluish than that of the initial material, and it is also fast against the action of chlorin.

In a similar manner the said initial coloring matter can be treated with di-methyl-sulfate, or with the methyl-ester of toluene sulfonic acid in the presence of caustic alkali, preferably at the temperature of from 60–80° C.

*Example 3.*

Boil together for 3 hours in a reflux apparatus, 2 parts of calcined soda, 2 parts of the methyl-ester of para-toluene sulfonic acid, 120 parts of nitrobenzene, and 2 parts of the initial coloring matter referred to in the foregoing example. When the mixture is cold, filter off the product, and free it from nitrobenzene, and from impurities which are soluble in water. The coloring matter, when dry, is a crystalline powder and appears identical with the coloring matter obtainable from the methyl-imid of anthracene-1.9-dicarboxylic acid as described in the foregoing Example 1.

In this example the nitrobenzene can be replaced by trichlor benzene, or naphthalene.

Now what we claim is:—

1. The new vat coloring matters of the anthracene series such as are obtainable by melting with caustic alkali anthracene-1.9-dicarboxylic acid imids in which the hydrogen of the imid group is substituted by a radical, which new coloring matters contain an imid group substituted by a radical, are soluble in alkaline hydrosulfite solution, giving from red to violet solutions and which dye cotton bluish-green shades of excellent fastness.

2. The new vat coloring matter of the anthracene series obtainable by melting the methyl-imid of anthracene-1.9-dicarboxylic acid with caustic alkali, which new coloring matter possesses a methyl-imid group, yields a red-brown solution in concentrated sulfuric acid, is soluble in alkaline hydrosulfite solution and yields a red-violet vat, which colors cotton red-violet shades, which shades on exposure to air become blue-green, and are very fast against the action of chlorin.

3. The process of producing vat coloring matter of the anthracene series by subjecting an anthracene-1.9-dicarboxylic acid imid in which the hydrogen of the imid group has been substituted by any radical to the action of a caustic alkaline melt.

4. The process of producing vat coloring matter of the anthracene series by subjecting the methyl-imid of anthracene-1.9-dicarboxylic acid to the action of a caustic alkaline melt.

In testimony whereof we have hereunto set our hands in the presence of two subscribing witnesses.

MICHAEL KARDOS.

PAUL NAWIASKY.

Witnesses to the signature of Michael Kardos:
H. OELLING,
G. VAIDAN.

Witnesses to the signature of Paul Nawiasky:
J. ALEC. LLOYD,
S. S. BERGER.